(12) United States Patent
Maas et al.

(10) Patent No.: US 11,833,534 B2
(45) Date of Patent: Dec. 5, 2023

(54) SYSTEM FOR DOSED DISPENSING OF A FLUID AND METHOD OF MANUFACTURING SUCH FLUID DISPENSING SYSTEM

(71) Applicant: DISPENSING TECHNOLOGIES B.V., Helmond (NL)

(72) Inventors: Wilhelmus Johannes Joseph Maas, Someren (NL); Paulo Nervo, Hoogeloon (NL); Josephus Cornelis Snijders, Liessel (NL)

(73) Assignee: Dispensing Technologies B.V., Helmond (NL)

( * ) Notice: Subject to any disclaimer, the term of this patent is extended or adjusted under 35 U.S.C. 154(b) by 0 days.

(21) Appl. No.: 17/467,064

(22) Filed: Sep. 3, 2021

(65) Prior Publication Data

US 2022/0126313 A1 Apr. 28, 2022

Related U.S. Application Data

(62) Division of application No. 15/742,105, filed as application No. PCT/EP2016/066455 on Jul. 11, 2016, now Pat. No. 11,141,749.

(30) Foreign Application Priority Data

Jul. 9, 2015 (EP) ..................................... 15176166

(51) Int. Cl.
*B05B 11/00* (2023.01)
*B05B 11/02* (2023.01)
(Continued)

(52) U.S. Cl.
CPC ........ *B05B 11/026* (2023.01); *B05B 11/0038* (2018.08); *B05B 11/0059* (2013.01);
(Continued)

(58) Field of Classification Search
CPC ........... B05B 11/00412; B05B 11/0038; B05B 11/00446; B05B 11/0059; B05B 11/3011; B05B 11/3077
See application file for complete search history.

(56) References Cited

U.S. PATENT DOCUMENTS 6,083,450 A * 7/2000 Safian .................. B65D 1/0215
222/105
11,141,749 B2 10/2021 Maas et al.
(Continued)

FOREIGN PATENT DOCUMENTS

| CN | 101815583 A | 8/2010 |
| EP | 0532873 A1 | 8/1992 |

(Continued)

OTHER PUBLICATIONS

International Preliminary Report on Patentability dated Jan. 18, 2018; for PCT/EP2016/066455; 7 pages.

*Primary Examiner* — J C Jacyna
(74) *Attorney, Agent, or Firm* — Shay Glenn LLP

(57) ABSTRACT

The invention relates to a system for dosed dispensing of a fluid, comprising a container for the fluid and a dispensing device connected therewith, wherein the container comprises a form-retaining outer container and a flexible inner container connected therewith, wherein a space to be brought into fluid communication with the ambient atmosphere can be developed between the inner and outer containers, and wherein the dispensing device includes a housing and/or frame of which at least a part is integrally formed with the container.

The invention further relates to a method of manufacturing a system for dosed dispensing of a fluid, comprising the steps of:

manufacturing a container for the fluid, said container comprising a form-retaining outer container and a flexible inner container connected therewith;

(Continued)

manufacturing a dispensing device comprising a housing and/or a frame; and assembling the container and the dispensing device; wherein at least a part of the dispensing device housing and/or frame is integrally formed with the container, and wherein assembling the container and the dispensing device comprises mounting a non-integrated part of the dispensing device in the part of the dispensing device housing and/or frame which is integrally formed with the container.

14 Claims, 15 Drawing Sheets

(51) Int. Cl.
| | |
|---|---|
| *B05B 11/10* | (2023.01) |
| *B29K 23/00* | (2006.01) |
| *B29K 67/00* | (2006.01) |
| *B29C 49/04* | (2006.01) |
| *B29C 49/06* | (2006.01) |
| *B29C 49/22* | (2006.01) |
| *B05B 15/30* | (2018.01) |

(52) U.S. Cl.
CPC .... *B05B 11/00446* (2018.08); *B05B 11/1077* (2023.01); *B05B 11/1011* (2023.01); *B05B 15/30* (2018.02); *B29C 49/04* (2013.01); *B29C 49/06* (2013.01); *B29C 49/22* (2013.01); *B29K 2023/06* (2013.01); *B29K 2023/12* (2013.01); *B29K 2067/003* (2013.01)

(56) References Cited

U.S. PATENT DOCUMENTS

| | | | |
|---|---|---|---|
| 2002/0113093 | A1 | 8/2002 | De Laforcade |
| 2005/0029291 | A1* | 2/2005 | Arghyris ............. B05B 11/3084 222/189.09 |
| 2005/0127107 | A1 | 6/2005 | Mbonyumuhire et al. |
| 2009/0318883 | A1 | 12/2009 | Sugahara et al. |
| 2011/0084098 | A1* | 4/2011 | Py .......................... B29B 11/08 137/511 |
| 2011/0210141 | A1 | 9/2011 | Maas et al. |
| 2015/0210420 | A1 | 7/2015 | Hosokoshiyama |

FOREIGN PATENT DOCUMENTS

| | | |
|---|---|---|
| FR | 2866321 A1 | 8/2005 |
| JP | 2013507590 A | 3/2013 |
| JP | 2014069876 A | 4/2014 |
| WO | WO2008/116656 A1 | 10/2008 |
| WO | WO2009/041809 A1 | 4/2009 |
| WO | WO2012/136935 A1 | 10/2012 |
| WO | WO2013/043938 A2 | 3/2013 |

* cited by examiner

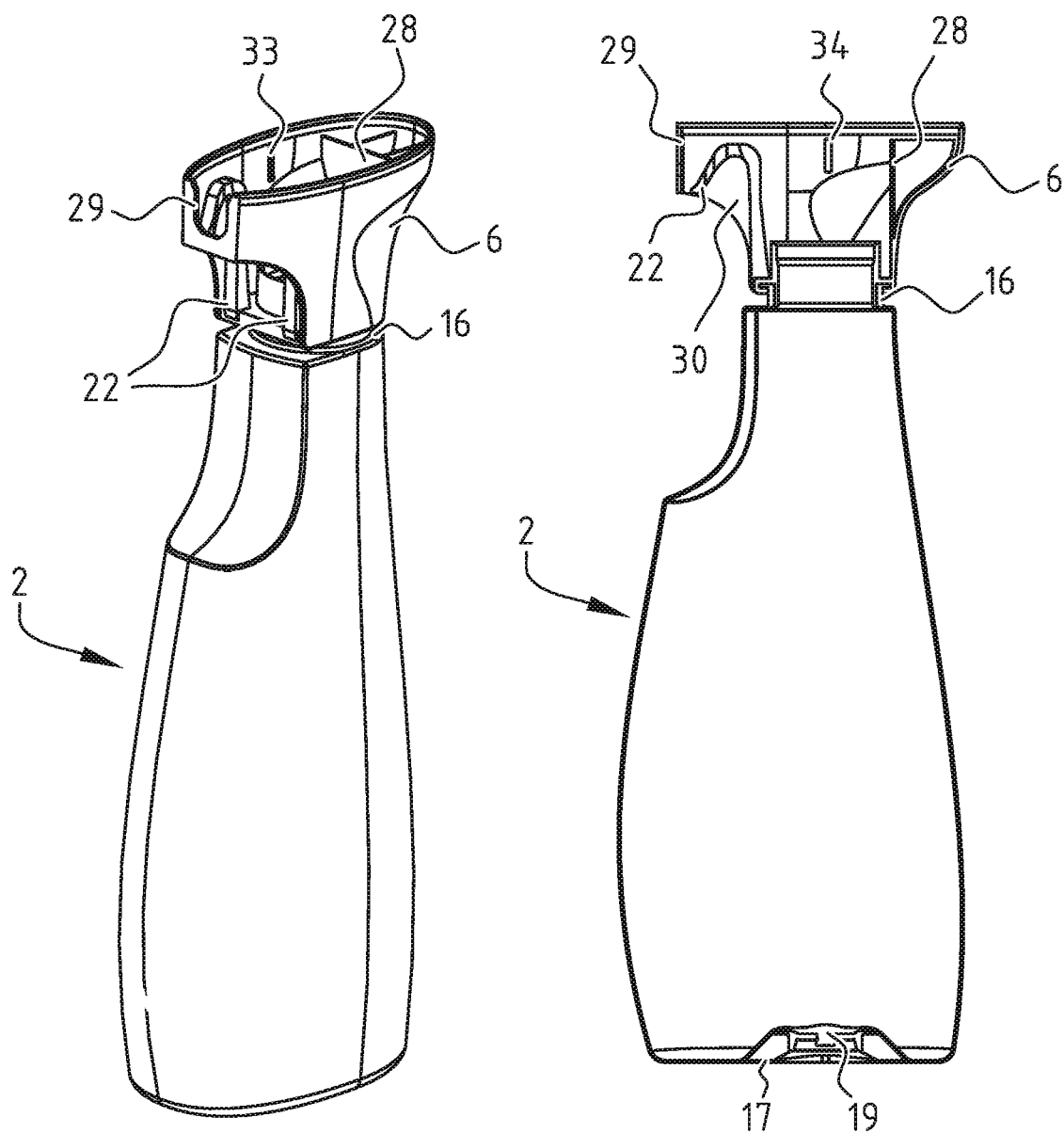

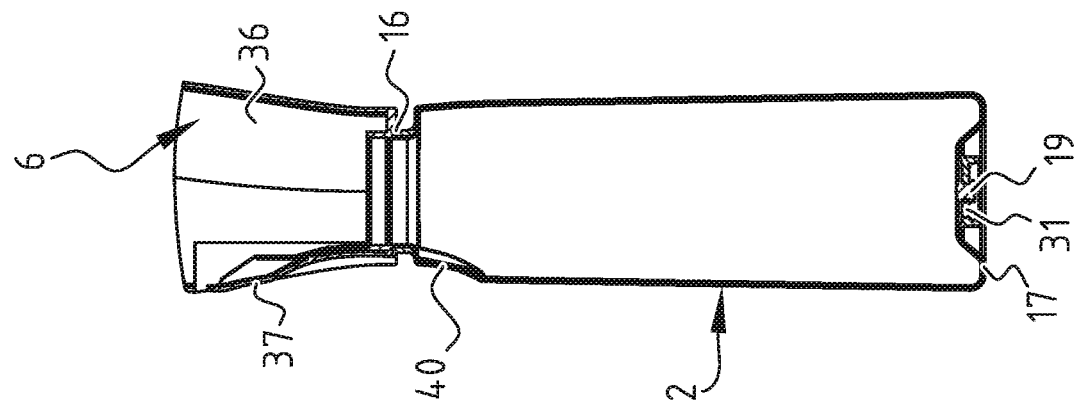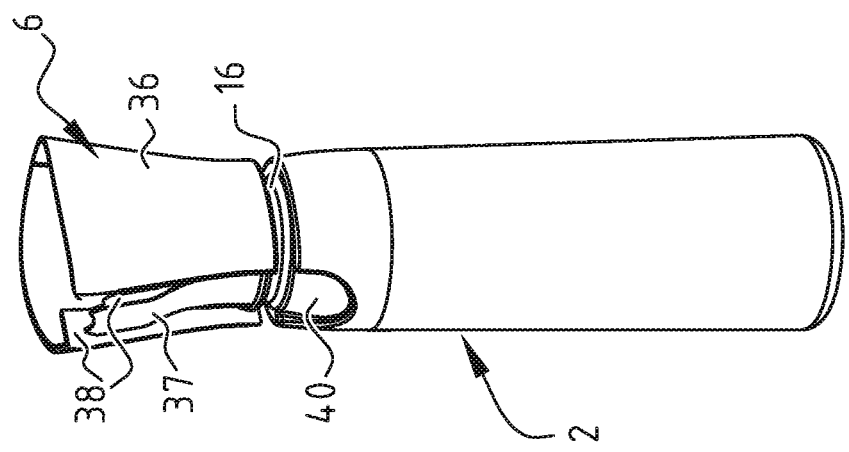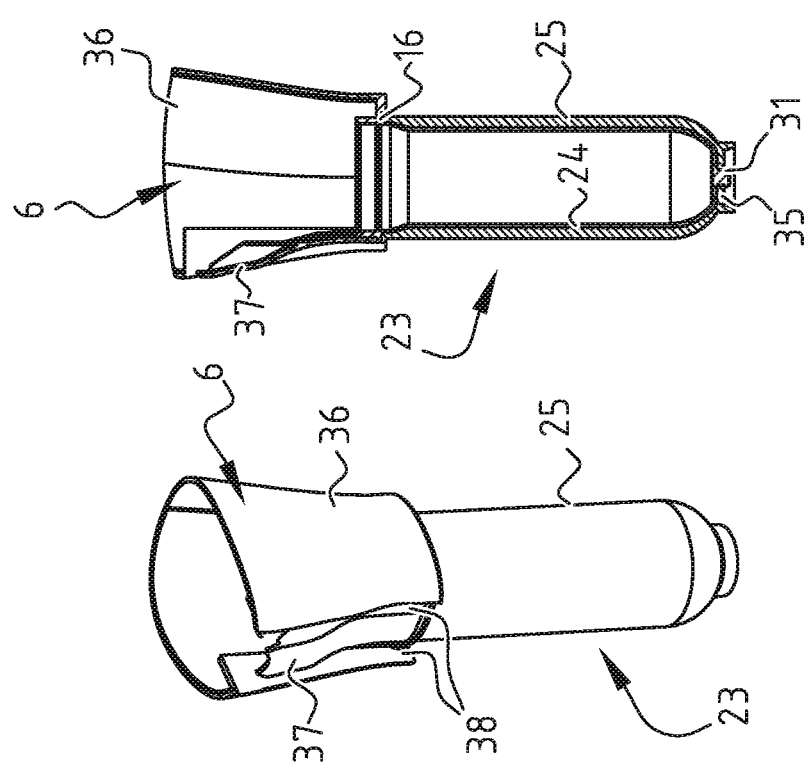

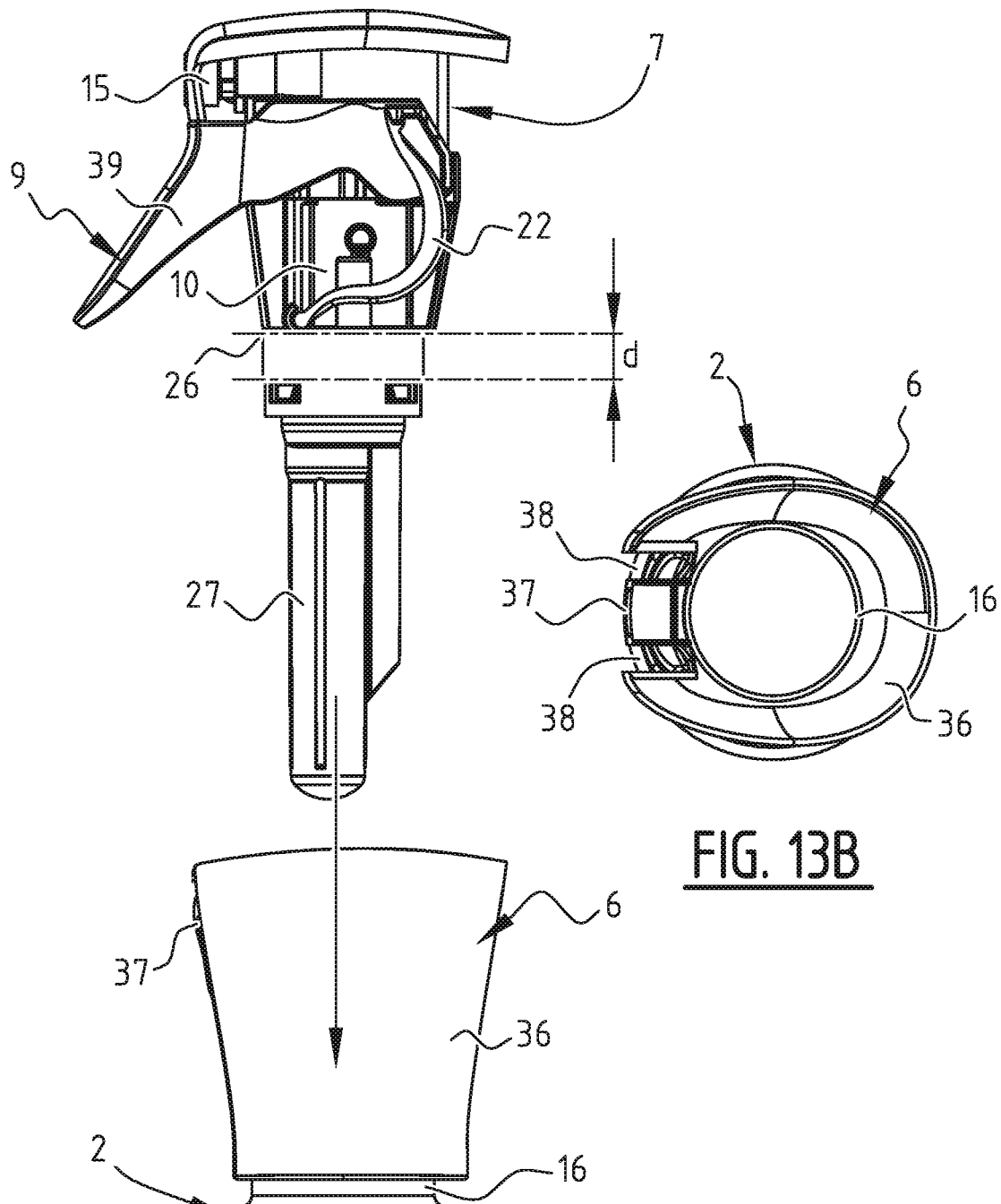
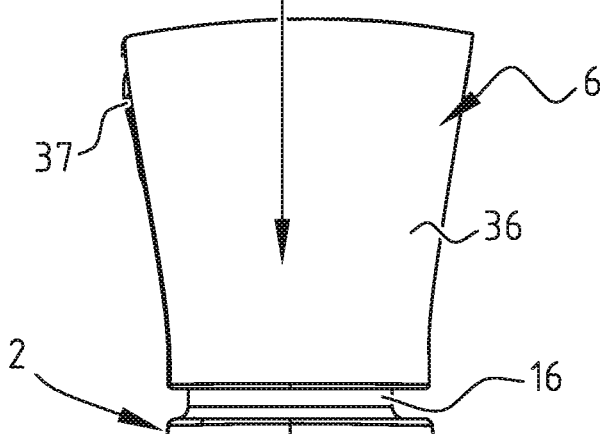
FIG. 13B
FIG. 13A

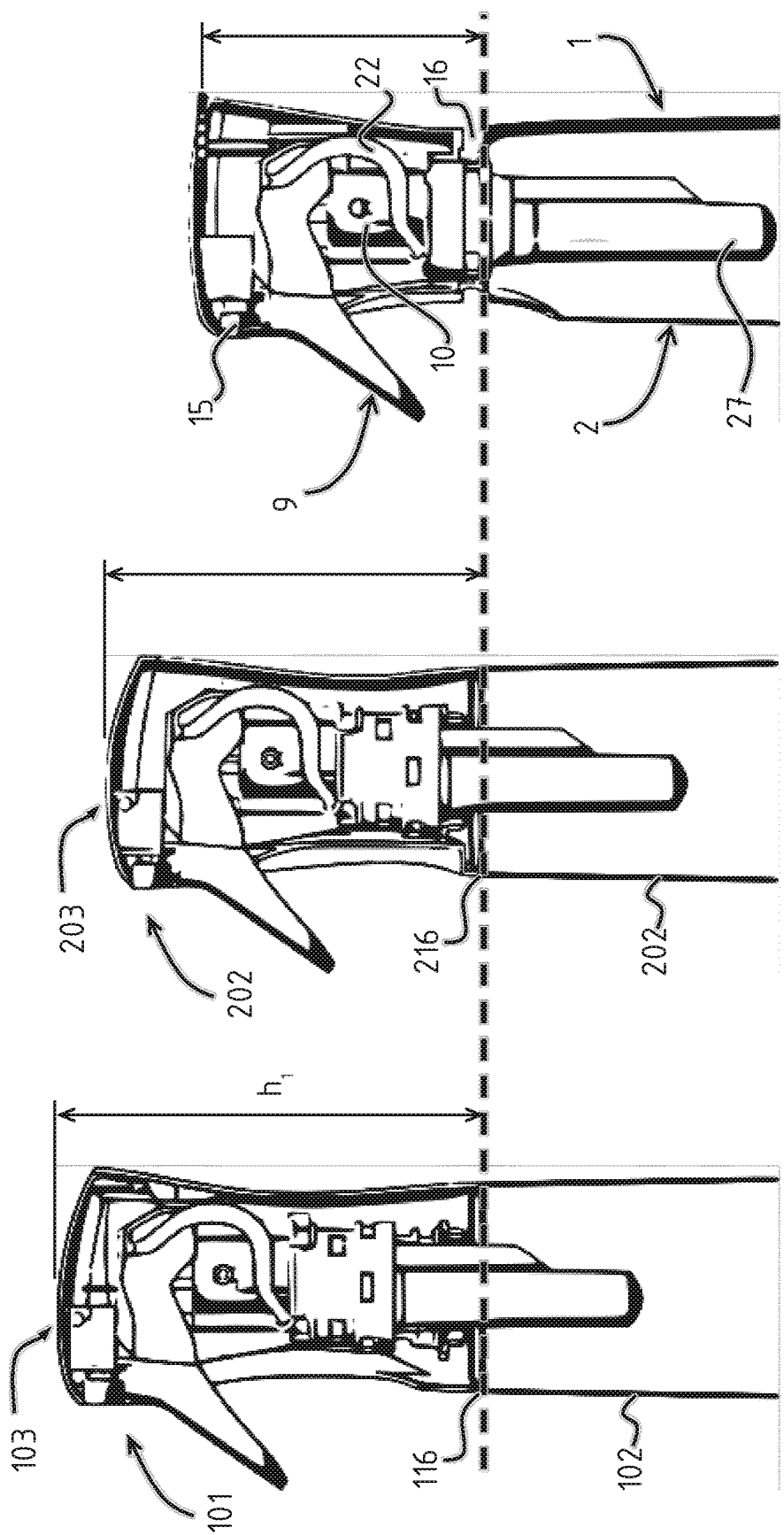

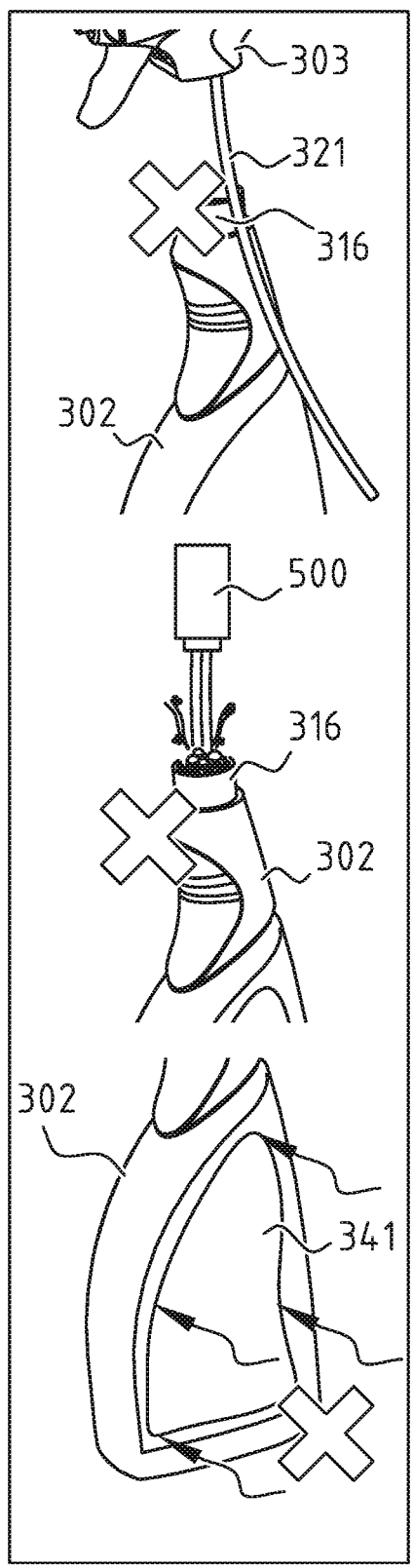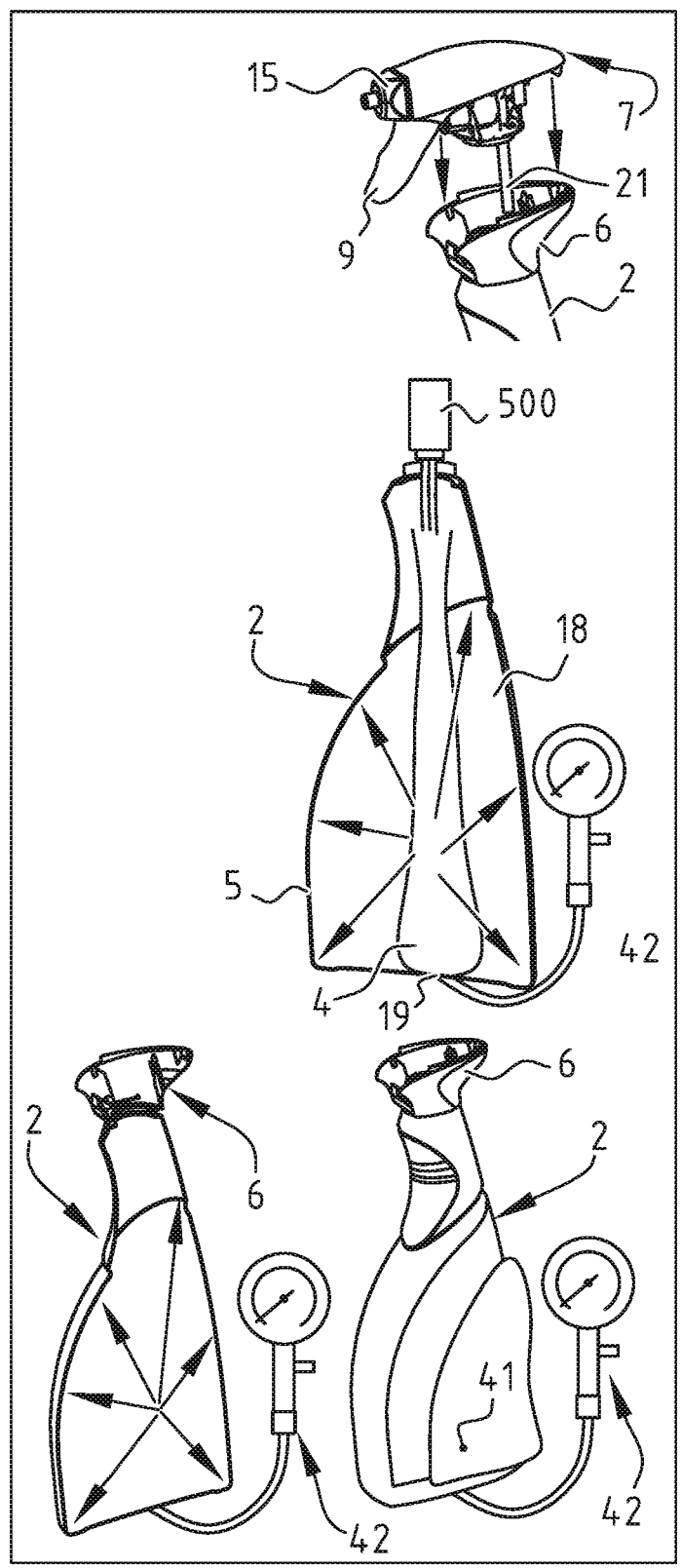
FIG. 15A
FIG. 15B

SYSTEM FOR DOSED DISPENSING OF A FLUID AND METHOD OF MANUFACTURING SUCH FLUID DISPENSING SYSTEM

CROSS REFERENCE TO RELATED APPLICATIONS

This application is a division of U.S. patent application Ser. No. 15/742,105, filed Jan. 5, 2018, which is the national phase entry of PCT/EP2016/066455, filed Jul. 11, 2016, which claims the benefit of EP Application 15176166.5, filed Jul. 9, 2015, herein incorporated by reference.

BACKGROUND

The invention relates to a system for dosed dispensing of a fluid, comprising a container for the fluid and a dispensing device connected therewith. Such a fluid dispensing system is commonly known and referred to as a trigger sprayer. Trigger sprayers are used for dispensing a variety of fluids, like e.g., detergents, air fresheners, etc.

Trigger sprayers are conventionally bought by end-users at normal retail outlets, e.g., supermarkets, gardening centers, DIY stores, etc. Transport of trigger sprayers from the plant where they are manufactured and filled to the final point of sale usually takes place in a specially designed or dimensioned packaging, in which the trigger sprayers are tightly packed and securely fixed in an upright position. Such a packaging is then usually unpacked at the point of sale by staff who place the trigger sprayers on shelves. End-users place the trigger sprayers in their shopping carts or baskets and after checkout are responsible for carrying the trigger sprayers to their homes or places of business. Since the trigger sprayers are normally transported in upright position, and since end-users will usually take good care of their purchases, trigger sprayers will not normally suffer during transport.

In recent years e-commerce has become increasingly important. Both professionals and consumers increasingly order products through the internet. These products are then shipped to the homes or places of business of the buyers, either by regular mail or by courier. Depending on the size of the order the products may be shipped individually or as part of a shipment including a number of—often dissimilar—products. These products will usually be packed such as to reduce the risk of immediate damage, but no further precautions are normally taken to ensure that products are transported in a predetermined orientation. In case of trigger sprayers, this means that they may be shipped in horizontal or even upside down position and that they may be in contact with other products, which may be heavier or harder. Therefore, there is a risk that a trigger sprayer will be deformed during transport, which in turn might lead to part or all of the fluid leaking from the trigger sprayer. Not only would this affect the value of the trigger sprayer, but leaking fluid could also damage other products that are packed with the trigger sprayer.

SUMMARY OF THE DISCLOSURE

The invention has for its object to provide a fluid dispensing system or trigger sprayer which is at least substantially free from leakage during transport, regardless of the position in which it is shipped. According to the invention, this is achieved in a fluid dispensing system of the type described above, in that the container comprises a form-retaining outer container and a flexible inner container connected therewith, wherein a space to be brought into fluid communication with the ambient atmosphere can be developed between the inner and outer containers, and wherein the dispensing device includes a housing and/or frame of which at least a part is integrally formed with the container.

In other words, the invention proposes to structurally integrate with the container a part which functionally belongs to the dispensing device. By making a portion of the housing and/or frame of the dispensing device as an integral part of the container, the coupling between the dispensing device and the container is stabilized, which prevents deformation and leakage at or near the neck of the container. Moreover, by providing an inner and an outer container and a space therebetween, there is no need for any vent opening in the dispensing device, which eliminates a further potential source of leakage.

In one embodiment of the fluid dispensing system, the inner and outer container are mutually connected at or near a neck of the container, and at least one of the inner or outer containers extends beyond the neck to form the integrated part of the dispensing device housing and/or frame. In this way the most critical part of the device is strengthened and stabilized to prevent leakage.

The integrated part of the dispensing device housing and/or frame may be integrally formed with the outer container. The outer container will often be made of a material that is stronger and more durable than that of the inner container.

Alternatively, the integrated part of the dispensing device housing and/or frame may be integrally formed with the inner container. The material of the inner container may be more flexible and often less expensive than that of the outer container.

It is also conceivable that one part of the housing and/or frame is integrated with the outer container, while another part is integrated with the inner container. In this way the most suitable material may be selected for each part.

A structurally simple fluid dispensing system is obtained when a non-integrated part of the dispensing device is mechanically fastened to the housing and/or frame part which is integrally formed with the container. A mechanical connection can be established quickly, so that the dispensing system lends itself to automated manufacturing in an assembly line. In one embodiment of the fluid dispensing system, the outer container comprises PET and the inner container comprises a polyolefin, in particular PE or PP. PET may be selected for its gas barrier properties, its strength and its stability, as well as for its excellent finish, while polyolefins may be selected for their chemical resistance and flexibility.

When the dispensing device comprises moveable parts, of which at least one is integrally formed with the container, the number of separate parts is further reduced, thus simplifying assembly of the fluid dispensing system.

In that case the moveable part may be integrally formed with one of the inner container and the outer container and the housing and/or frame part may be integrally formed with the other of the inner and outer container, so that the functions are separated and an optimum material may be selected for each function.

In case the outer container comprises PET and the inner container comprises a polyolefin, the moveable part may comprise a biasing member which is integrally formed with the outer container while the housing and/or frame part is integrally formed with the inner container. A biasing member in PET may be relatively strong and stable.

The fluid dispensing system may be manufactured very efficiently when the container is formed by injection moulding followed by blow moulding.

Alternatively, the container may be formed by co-extrusion followed by blow moulding.

The invention further relates to a method of manufacturing a system for dosed dispensing of a fluid, comprising the steps of:
manufacturing a container for the fluid, said container comprising a form-retaining outer container and a flexible inner container connected therewith;
manufacturing a dispensing device comprising a housing and/or a frame; and
assembling the container and the dispensing device.

Such a method is conventionally used for manufacturing fluid dispensing systems such as trigger sprayers. This conventional method involves the use of a relatively great number of separate parts which have to be supplied to a manufacturing plant and/or kept in stock. Moreover, the conventional method involves a relatively large number of steps, which renders it time-consuming and costly. And finally, some steps of the conventional manufacturing method entail a relatively large number of manufacturing errors or failures, leading to loss of production.

The invention seeks to provide an improved method with which a fluid dispensing system may be made more efficiently, using a smaller number of parts and steps and reducing the failure rate. In accordance with the invention, this is achieved in that at least a part of the dispensing device housing and/or frame is integrally formed with the container, and in that assembling the container and the dispensing device comprises mounting a non-integrated part of the dispensing device in the part of the dispensing device housing and/or frame which is integrally formed with the container.

In one embodiment manufacturing the container comprises injection moulding a preform of the container and then blow moulding the preform into the container.

In that case, when the preform includes an inner layer and an outer layer, injection moulding the preform may include injection moulding one of the inner and outer layers and then injection moulding the other of the inner and outer layers in two subsequent steps in a multi-component injection moulding process. In this way the number of assembly steps is reduced.

Alternatively, again when the preform includes an inner layer and an outer layer, injection moulding the preform may include injection moulding the inner and outer layers in separate injection moulding processes and the inner and outer layers may be assembled after said injection moulding. In this way relatively simple moulds may be used for injection moulding the layers.

BRIEF DESCRIPTION OF THE DRAWINGS

The invention will be illustrated by way of a number of exemplary embodiments thereof, with reference being made to the annexed drawing, in which:

FIGS. 6A and 6B show similar views of the container which is blow moulded from the preform of FIG. 5;

FIGS. 11A and 11B show a perspective view and a longitudinal sectional view, respectively, of the preform from which the container of the fluid dispensing system of FIG. 10 is blow moulded;

FIGS. 12A and 12B show similar views of the container obtained by blow moulding the preform of FIG. 11;

FIG. 13A is a side view, partially in longitudinal section, showing how the dispensing device is mounted in the neck of the container of the embodiment of FIGS. 10-12;

FIG. 13B is a top view of the container of FIGS. 10-12;

FIGS. 14A to 14C illustrate the compactness of this embodiment of the fluid dispensing system when compared to conventional systems;

FIGS. 15A and 15B illustrate various advantages of the fluid dispensing system of the invention over a conventional fluid dispensing system.

DETAILED DESCRIPTION

Figure 1:
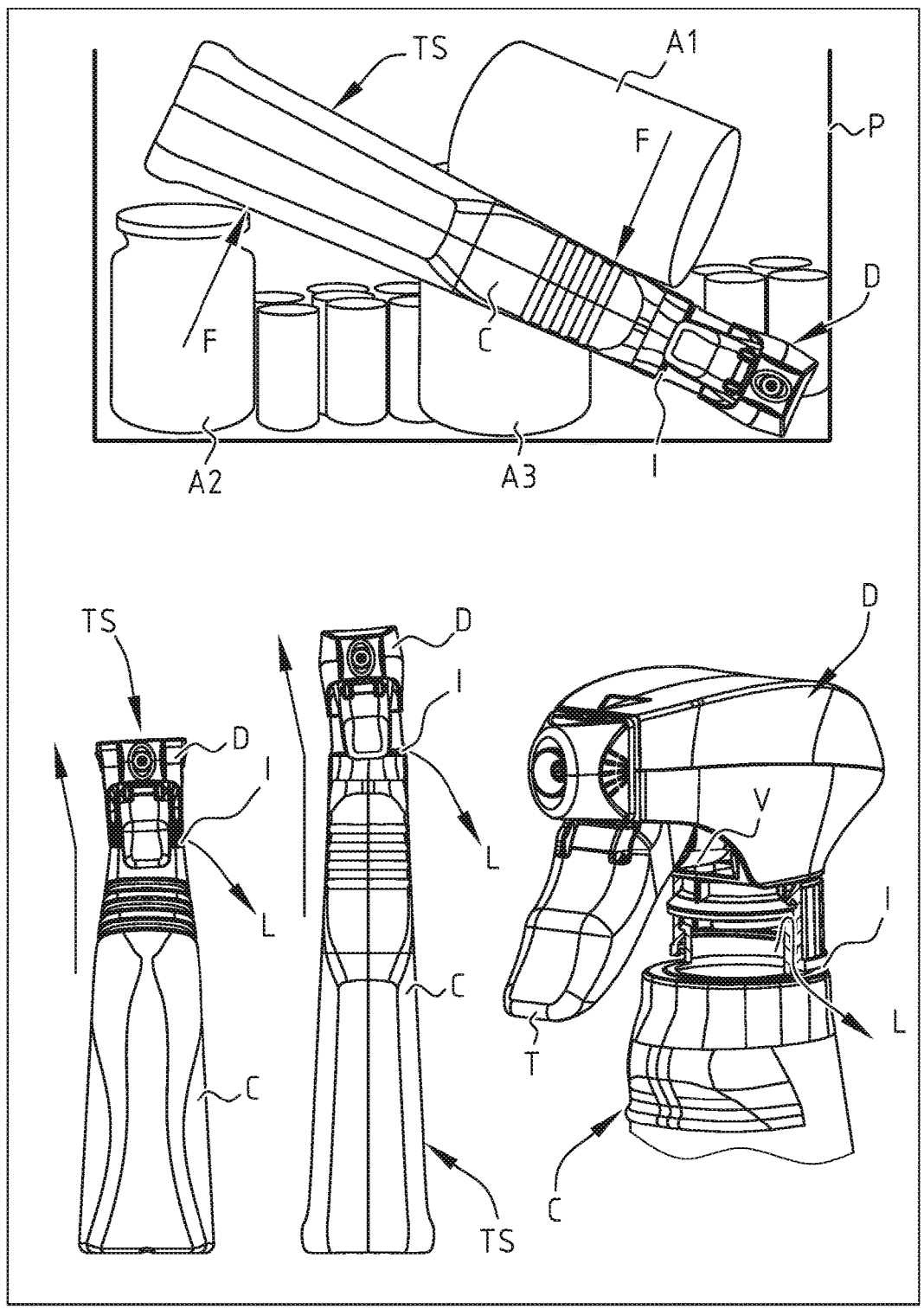
FIG. 1 illustrates the problems arising when transporting conventional trigger sprayers.

A major problem when transporting conventional fluid dispensing systems or trigger sprayers TS in a packaging which also includes other articles A1-An, is that forces F acting on the trigger sprayer TS may cause deformation, in particular at the interface I between the dispensing device D and the container C (FIG. 1). These forces F are caused by the fact that the trigger sprayer TS, when packed with random articles A forming part of the same order, is not properly supported in the packaging P. The interface I is normally at the neck of the container C, where the dispensing device D is screwed or snapped onto the container C. Deformation in this area (schematically illustrated by the bent arrows) may lead to leakage L of the contents of the container C. Apart from deformation of the trigger sprayer TS, another source of leakage is the vent opening V which will normally be arranged in the cylinder of the dispensing device D and which will be exposed whenever the trigger T is depressed—which may occur inadvertently when the trigger sprayer TS is being transported in a packaging P with other articles A as part of an internet order.

Figure 2:
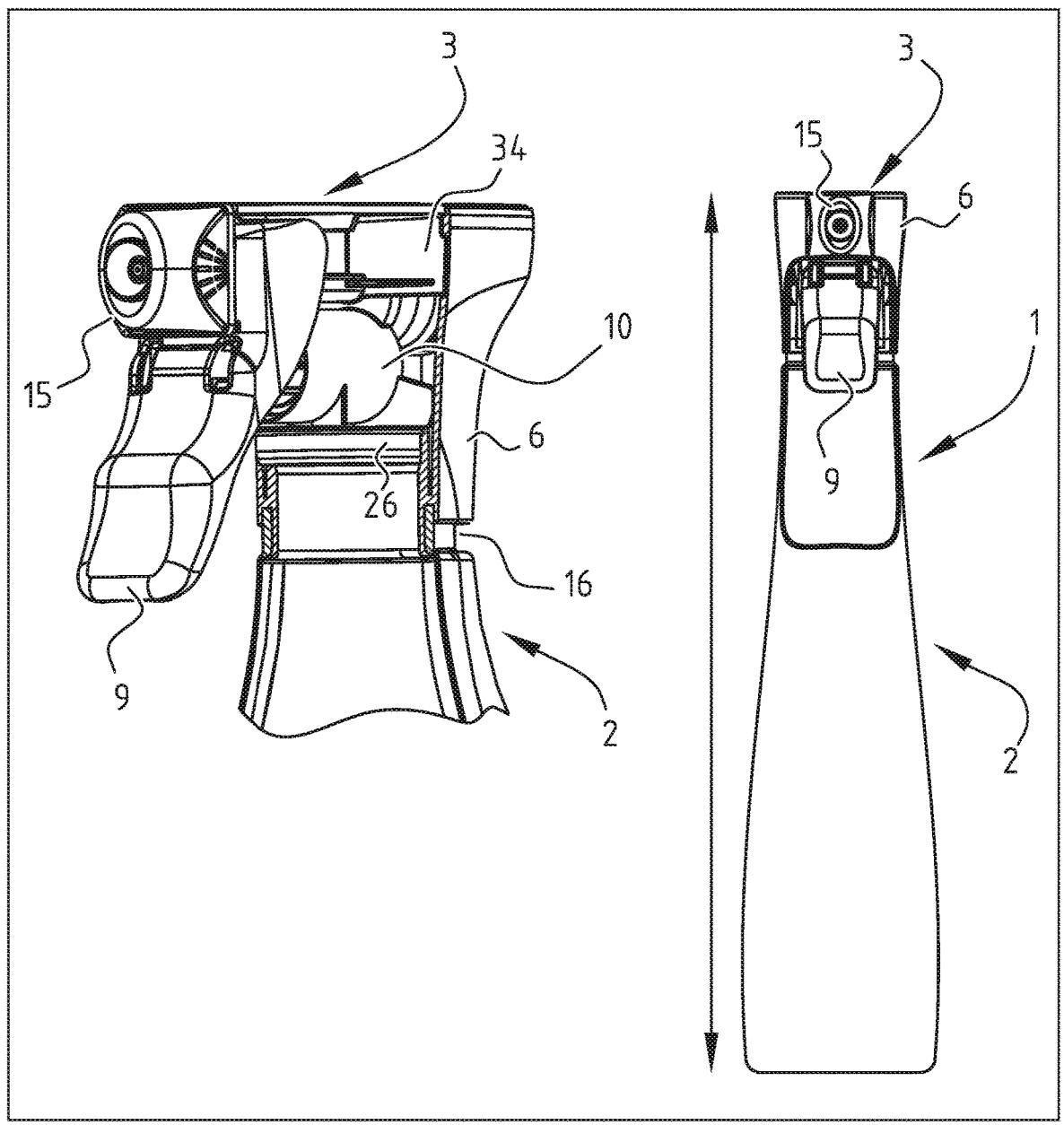
FIG. 2 shows features of the dispensing system of the invention which contribute to solving these problems.

Part of the solution proposed by the invention is schematically shown in FIG. 2. By forming a part 6 of the housing and/or frame—in the illustrated embodiment the so-called "shroud"—of the dispensing device 3 as an integral part of the container or "bottle" 2, a stable fluid dispensing system 1 is obtained, where leakage in the neck area 16 of the container 2 is prevented. This is schematically represented by the straight or unbent arrow.

Figure 3A:
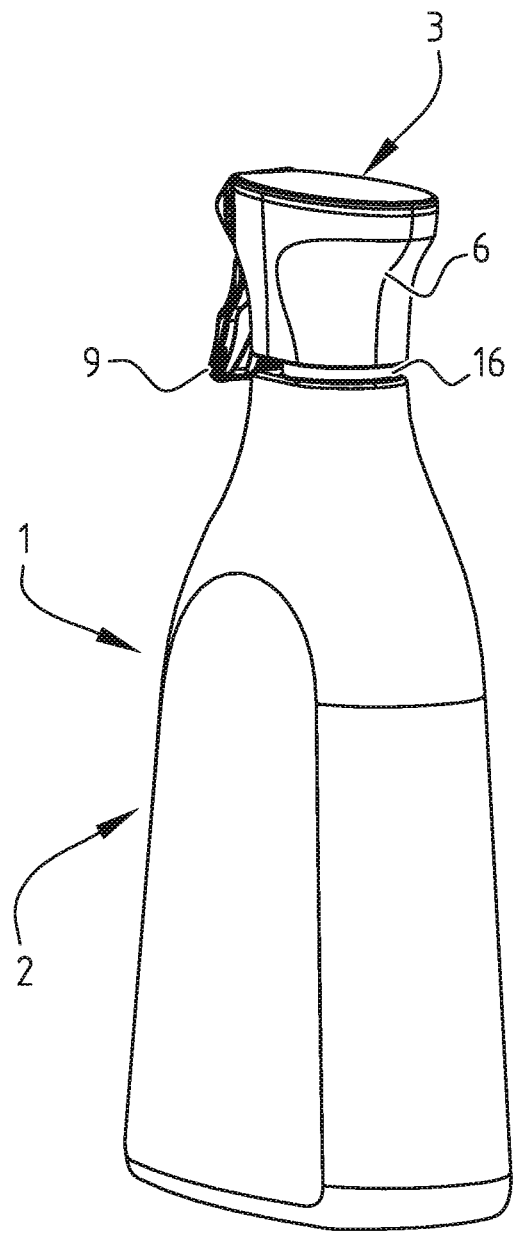
FIGS. 3A and 3B show a perspective exterior view and a partially cut-away perspective view, respectively, of a first embodiment of the fluid dispensing system of the invention, wherein the inner container has already been partially emptied.
Figure 3B:
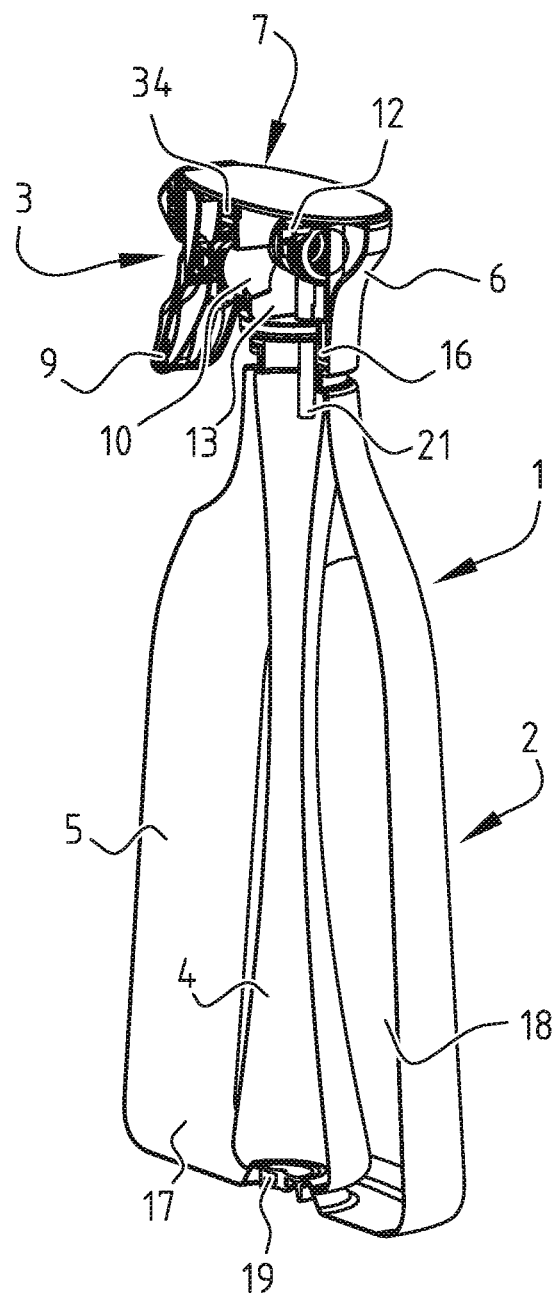

The container 2 of the fluid dispensing system 1 comprises a flexible inner container or bag 4 and a form-retaining or stiff outer container 5 (FIG. 3B). In the illustrated embodiment the inner container may be made of a polyolefin, e.g., PE or PP, while the outer container 5 may be made of PET. Polyolefins have excellent chemical resistance and provide flexibility, while PET has good gas barrier properties and provides strength and stability, as well as an excellent finish. Thus, the inner and outer containers 4, 5 have complementary properties. It will be clear that other material may be selected for the inner and outer layers, depending on the intended use of the fluid dispensing system.

The inner and outer containers 4, 5 are connected to each other at or near the neck 16. In the illustrated embodiment the inner and outer containers 4, 5 are further connected to each other at the bottom 17 of the container 2, e.g., in the way described in WO 2009/041809 A1, the disclosure of which is incorporated herein by reference. This connection includes a protrusion 31 of the inner layer 24 which extends through the bottom 35 of the outer layer 25 of the preform 23. A space 18 between the inner and outer containers 4, 5 can be connected to the surrounding atmosphere by an opening 19. In the illustrated embodiment the opening 19 is formed in the bottom 17 near or around the connection between the inner and outer containers 4, 5. Alternatively or additionally, an opening could be formed in the neck area 16 or in any other part of the outer container 5. Since this opening allows ambient air to fill the space 18 whenever fluid is dispensed from the inner container 4, there is no need for any venting opening in fluid communication with the interior of the container, as is required in conventional containers. Thus a further potential source of leakage is eliminated.

One of the layers of the container 2, i.e., either the inner container 4 or the outer container 5 extends beyond the neck area 16 to form the integrated part 6 of the housing and/or frame of the dispensing device 3. In this embodiment it is the inner container 4, made of PP, which extends and forms the shroud 36 of the dispensing device 3. In other words, the shroud 36, which from a functional point of view forms part of the dispensing device 3, is structurally integrated with the container 2.

Figure 9A:
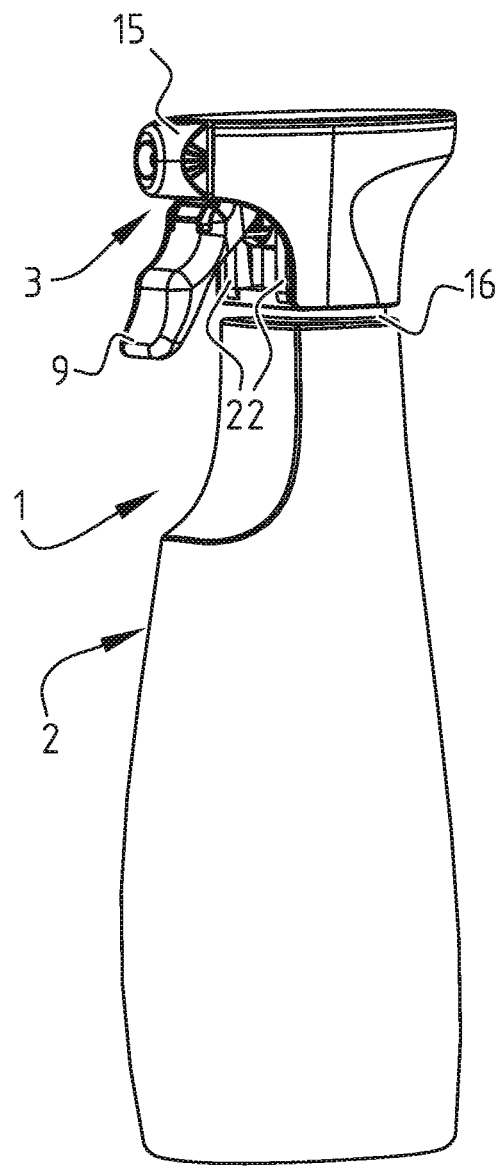
FIG. 9A shows a perspective view of the fluid dispensing device of FIGS. 3-7 in finished state.
Figure 9B:
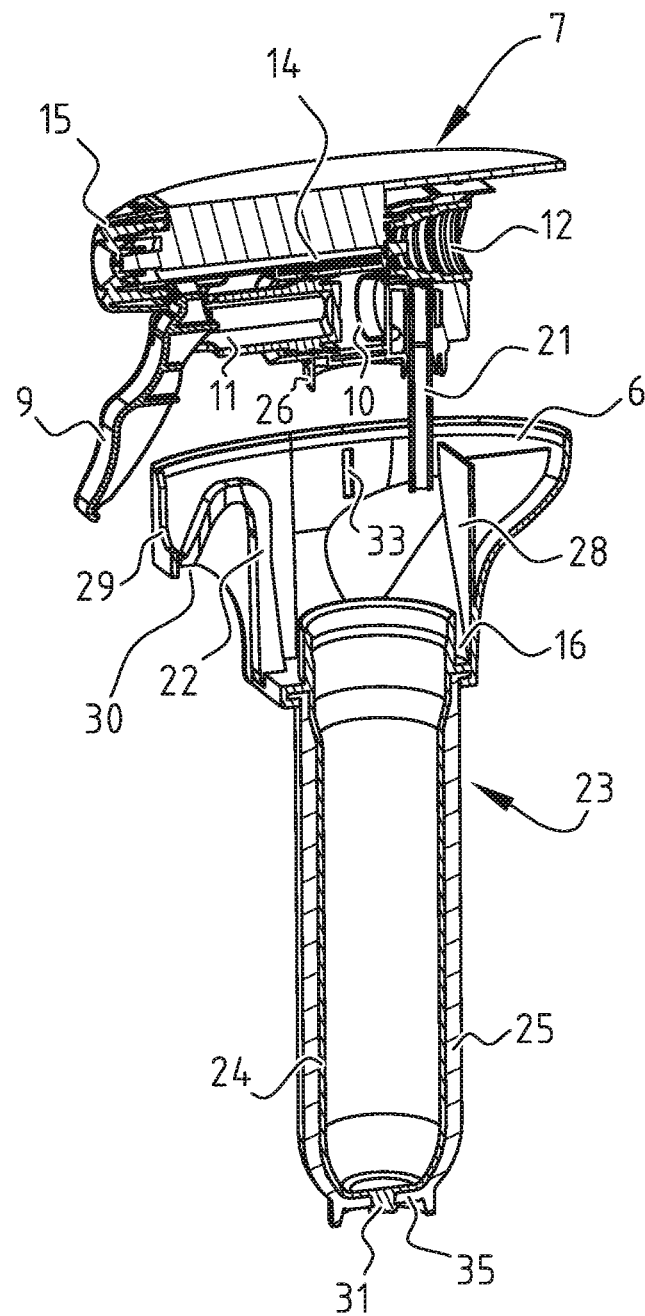
FIG. 9B shows an exploded perspective view of the preform and dispensing device.

The part 7 of the dispensing device 3 that is not integrally moulded with the container 2 has a number of moving parts. In this embodiment the non-integrated part 7 of dispensing device 3 includes a one-piece body or frame 13 which includes a piston chamber 10 in which a piston 11 is arranged for reciprocating movement (FIG. 9B). The piston 11 is driven by a trigger 9 which is pivotably connected to the frame 13. Two biasing members 22 bias the trigger 9 to a standby position in which the piston 11 is in its extended position removed from an end wall of the piston chamber 10. The piston chamber 10 is connected to a fluid inlet 20, which can be connected to a dip tube 21 extending into the container 2. The piston chamber 10 is further connected to an outflow channel 14 that is formed in the frame 13.

Operating the trigger 9 moves the piston 11 towards an end wall 32 of the piston chamber 10, compressing any fluid or air that is present in the piston chamber 10. Releasing the trigger 9 allows the biasing members 22 to move the trigger 9 and piston 10 towards the standby/extended position, thus creating a partial vacuum in the piston chamber 10 which will draw in fluid from the container 2. Repeated operation of the trigger 9 fills the piston chamber 10 with fluid under pressure. A precompression valve 12, e.g., a domed diaphragm valve as described in detail in WO 2008/116656 A1, the disclosure of which is incorporated herein by reference, is arranged between the piston chamber 10 and the outflow channel 14. The precompression valve 12 is pretensioned by being arranged between the frame 13 and a wall 28 that has been integrally moulded with the shroud 36 and the container 2. This precompression valve 12 ensures that fluid is only dispensed when a predetermined pressure is reached in the piston chamber 10. The outflow channel 14 terminates in a nozzle 15 that converts the stream of pressurized fluid into a spray.

In the illustrated embodiment not only the shroud 36, but also the biasing members 22, which also form a functional part of the dispensing device 3, are integrally formed with the container 2. But while the shroud 36 is integrally formed with the inner container 4, the biasing members 22 are integrally formed with the outer container 5, i.e., the other of the two layers.

Figure 4A:
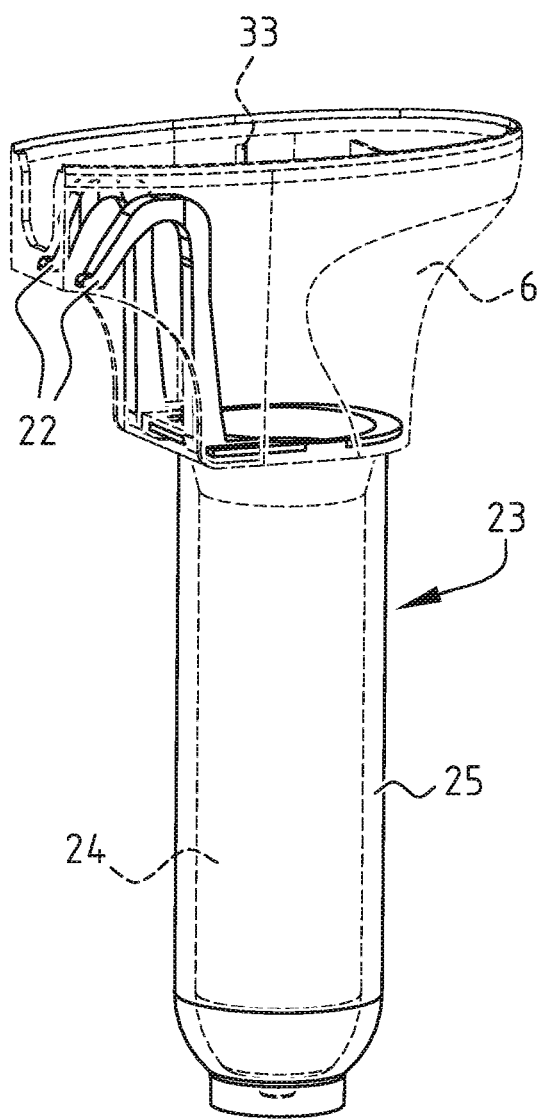
FIG. 4A shows a preform from which the container of the fluid dispensing system of FIG. 3 is blow moulded.
Figure 4B:
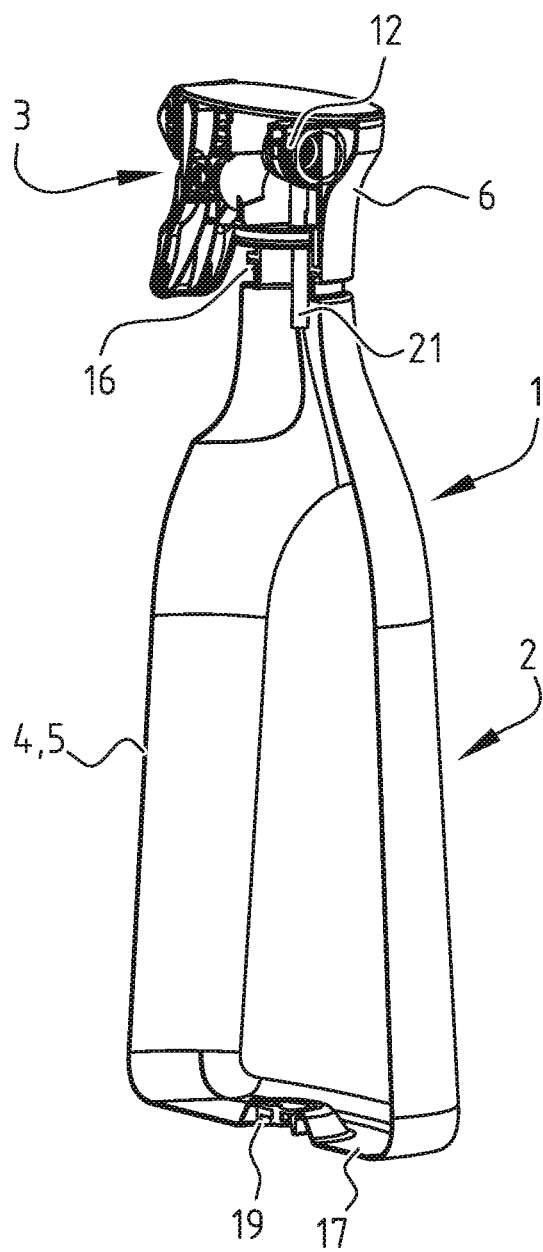
FIG. 4B shows the fluid dispensing system after blow moulding of the preform.
Figure 5A:
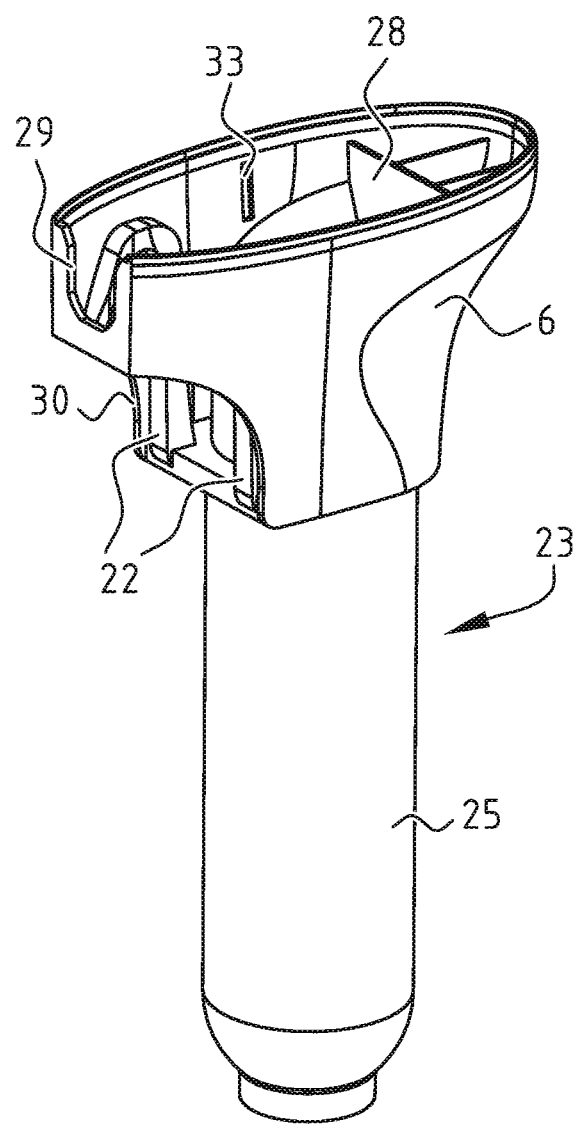
FIGS. 5A and 5B show a perspective view and a longitudinal sectional view, respectively, of the preform of FIG. 4.
Figure 5B:
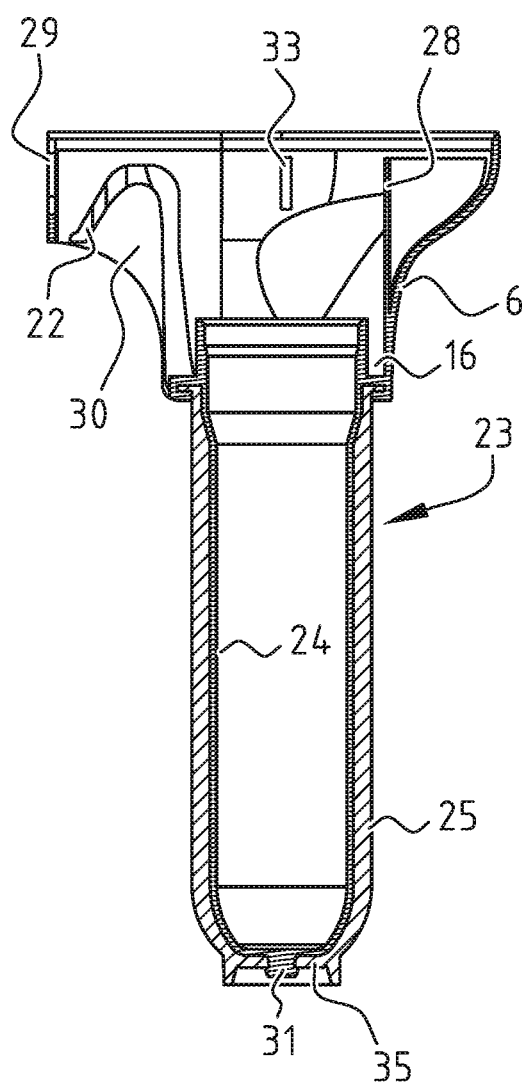

The inner and outer containers 4, 5 are both formed by injection moulding followed by blow moulding. Injection moulding results in a preform 23 shaped like a test tube (FIGS. 4A, 5A, 5B). This preform 23 has an inner layer 24 and an outer layer 25, which after blow moulding will form the inner container 4 and the outer container 5, respectively (FIGS. 4B, 6). The shroud 36 and the biasing member 22 are formed when the layers 24, 25 are injection moulded, and maintain their shape and dimensions during blow moulding. The inner and outer layers 24, 25 may be separately injection moulded and then connected, or they may be formed in a multi-component injection moulding process.

Figure 7A:
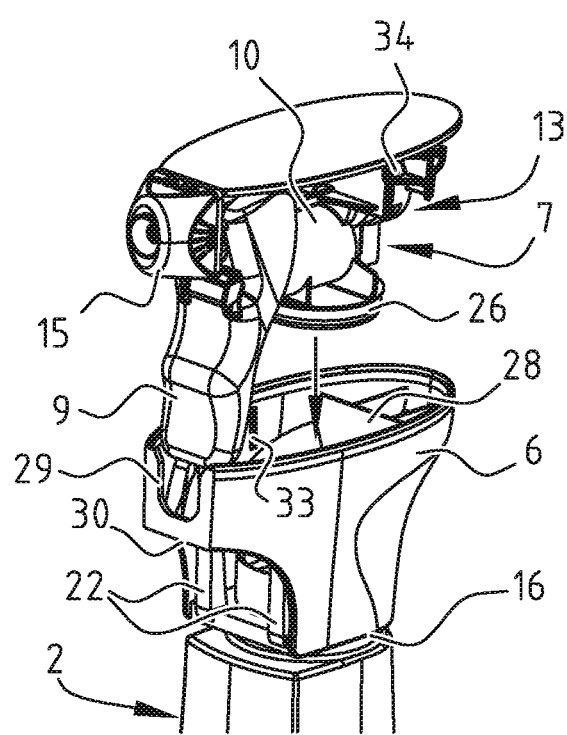
FIG. 7A is a perspective view showing how the fluid dispensing system is assembled.

The part 7 of the dispensing device 3 that is not integrally formed with the container 2—in the illustrated embodiment the frame 13, trigger 9, piston 11 and nozzle 15—is assembled with the container 2—including the integrated part 6 of the housing, in this case the shroud 36, and the integrated biasing member 22—by mechanical fastening. Various forms of mechanical fastening can be contemplated, including snap-fitting by means of protrusions 34 on the frame 13 and recesses 33 in inside of the shroud 36 (FIG. 7A), screwing or connecting by a bayonet. All these fastening systems ensure excellent sealing between a lower edge 26 of the frame 13 and the neck 16 of the container 2. When the non-integrated part 7 of the dispensing device 3 is pressed onto the container 2 in the direction of the arrow, the nozzle 15 will be received in a recess 29 in the shroud 36, while the trigger 9 will protrude downwardly though an opening 30 in the shroud 36.

Figure 7C:
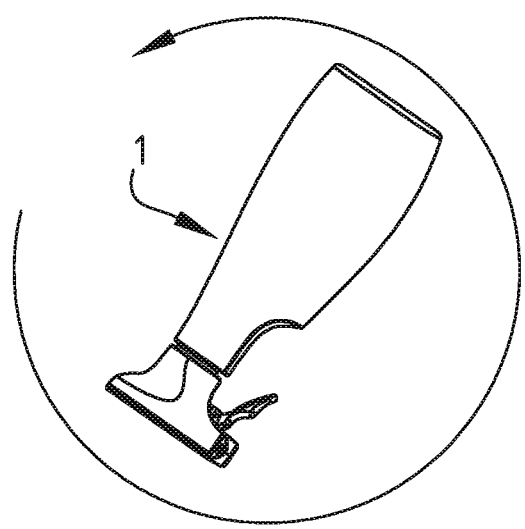
FIG. 7C is a schematic drawing showing the fluid dispensing system in an inverted orientation.
Figure 7B:
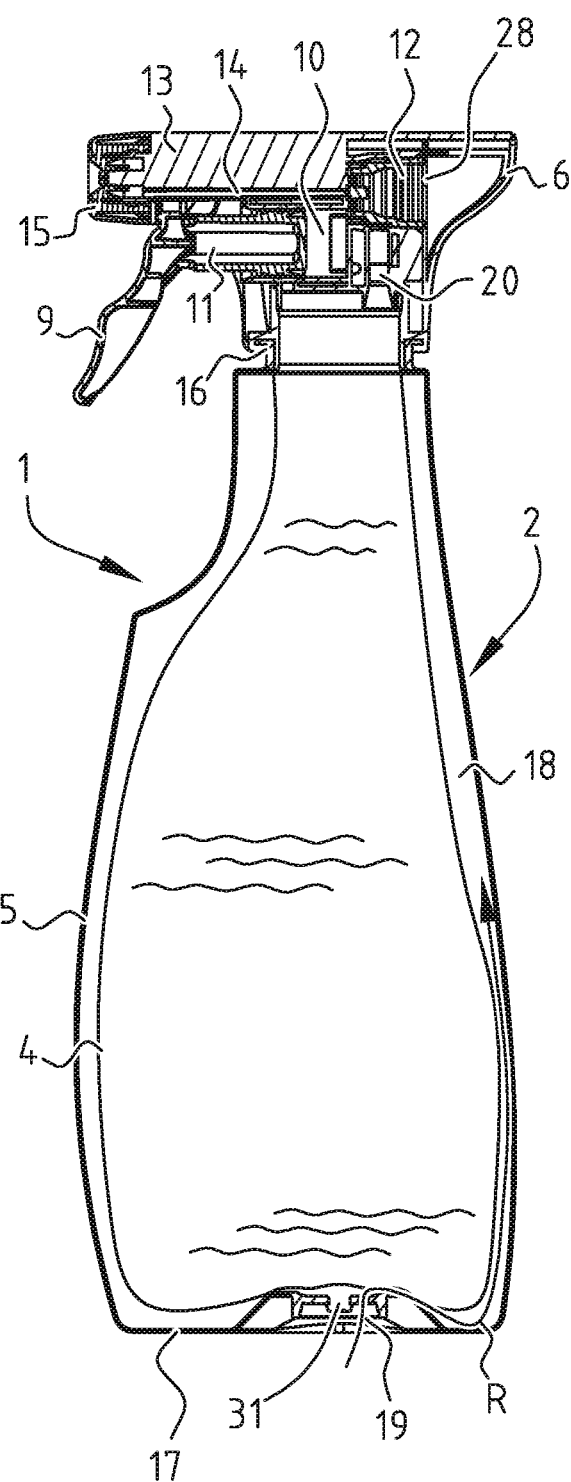
FIG. 7B is a longitudinal sectional view showing the finished system when in use for dispensing a fluid.
Figure 8:
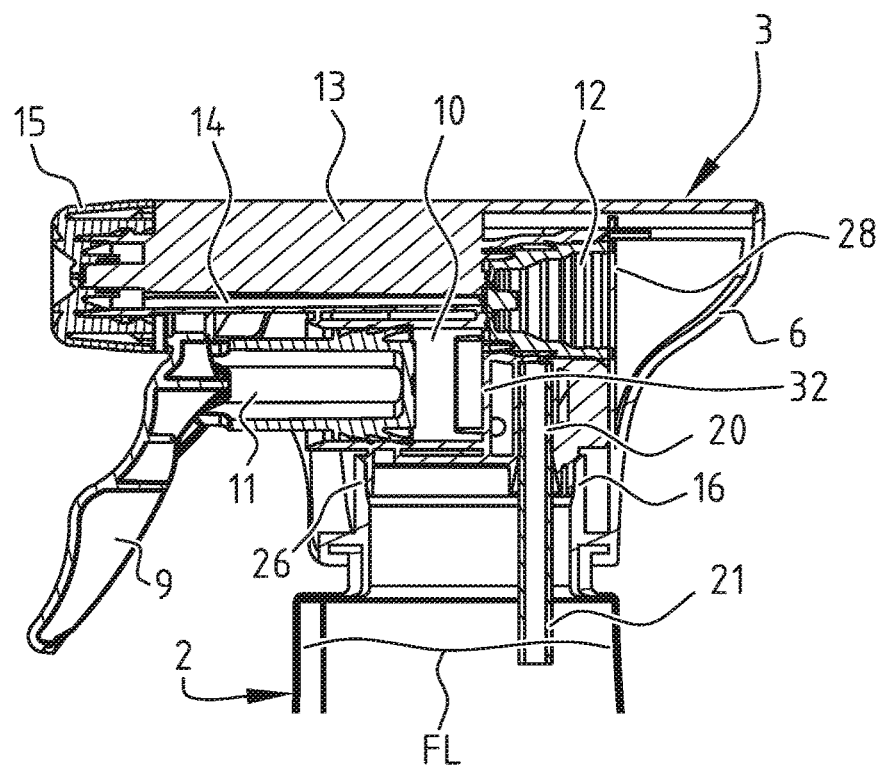
FIGS. 8A and 8B are longitudinal sectional views showing two variants of the dispensing device used in the fluid dispensing system of FIG. 7.
Figure 8:
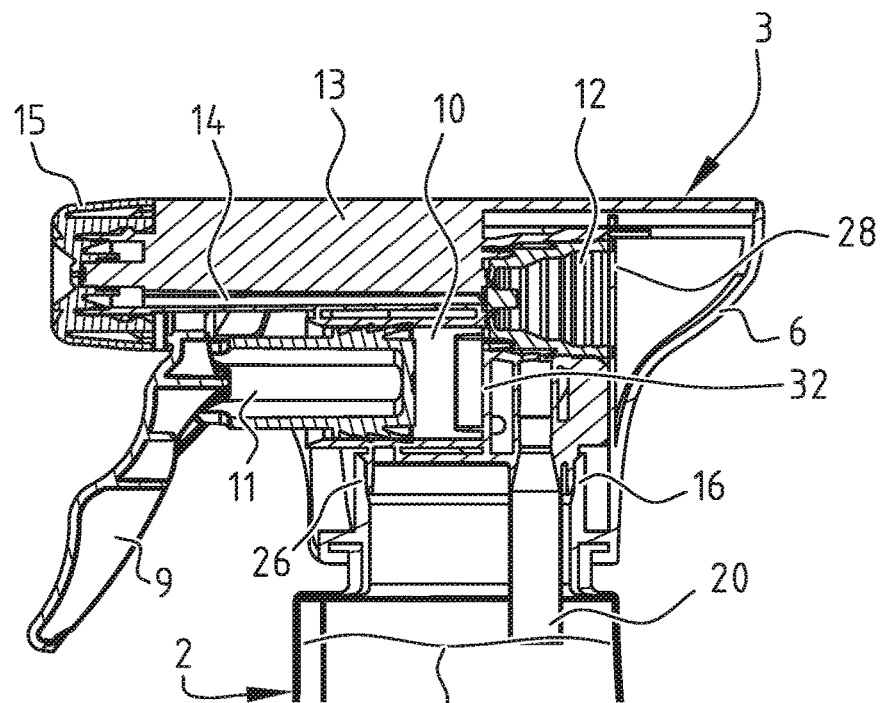

Since the container 2 is vented by allowing replacement air R into the space 18 between the inner and outer containers 4, 5 (FIG. 7B) there is no (or at least hardly any) "head" of air inside the inner container 4 in contact with the fluid. Consequently, the inlet 20 or dip tube 21 will always be in contact with the fluid, so that the fluid dispensing system 1 can be used in any possible orientation (FIG. 7C). As in practice there may remain a small amount of air over the fluid level FL due to the fact that the container cannot be filled exactly to the brim, the inlet 20 may be lengthened (FIG. 8B) or a dip tube 21 may be used (FIG. 8A), although such dip tube can be much shorter than dip tubes in conventional trigger sprayers, as will be discussed below.

Figure 10:
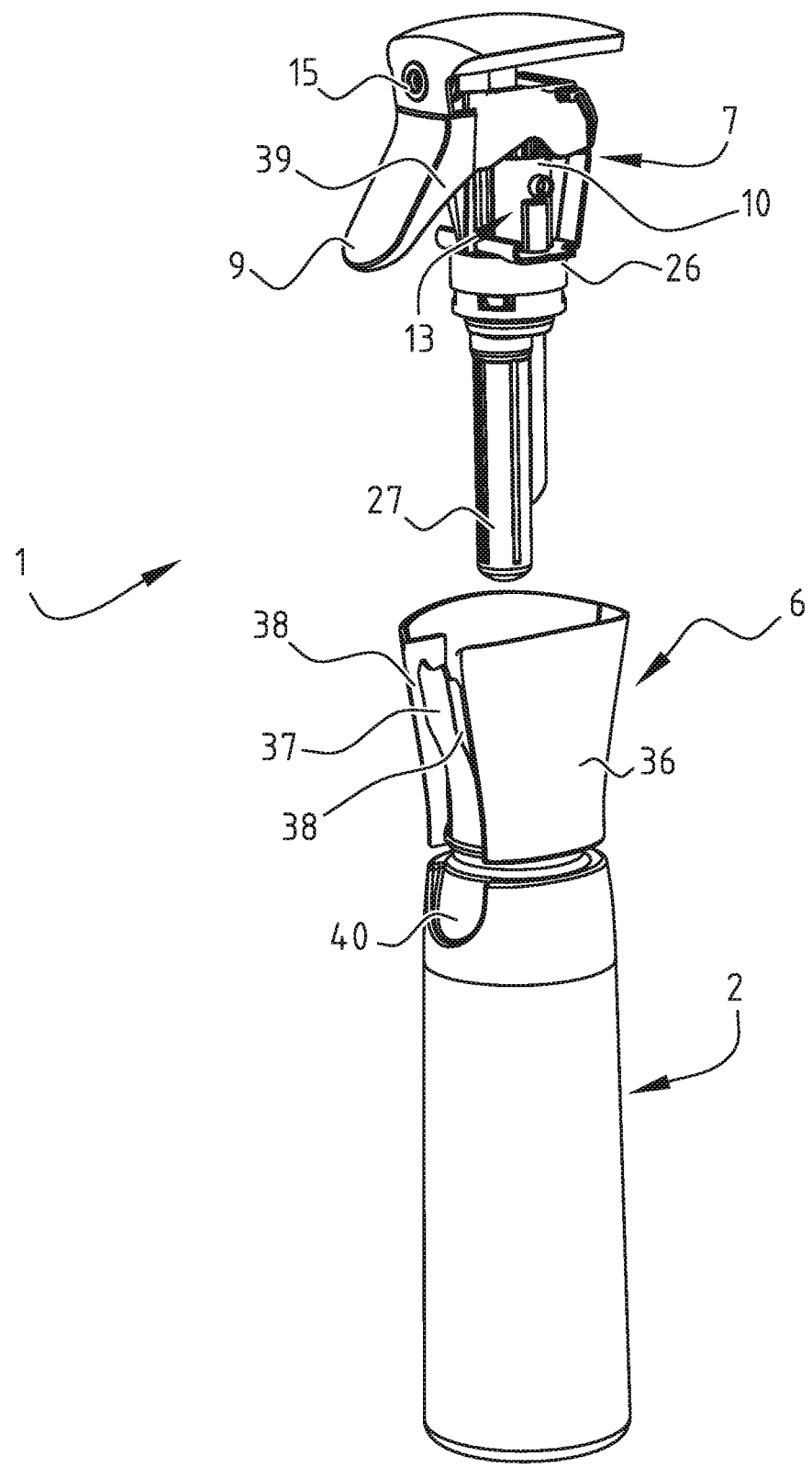
FIG. 10 shows an exploded perspective view of an alternative embodiment of the fluid dispensing system of the invention.

As shown in FIG. 10, the principles underlying the invention can also be applied to a buffering trigger sprayer with aerosol functionality of the type disclosed in WO 2013/043938 A2, the disclosure of which is incorporated herein by reference. The dispensing device 3 of this fluid dispensing system 1 mainly differs from that of the first embodiment by the presence of a buffer 27. This buffer 27 serves to accommodate a surplus of fluid which has been pressurized in the piston chamber 10 but cannot pass the nozzle 15 at the rate at which it is supplied from the piston chamber 10. Moreover, the piston chamber 10 is vertically arranged in the frame 13, rather than horizontally as in the previous embodiment. Consequently, the piston (not shown) also reciprocates in vertical direction. And as a final difference the precompression valve (not shown) is arranged between the outlet channel (which is not shown either but which also runs vertically) and the nozzle 15.

In this embodiment only a part 6 of the housing and/or frame—here the shroud 36—of the dispensing device 3 is integrally formed with the container 2. In this embodiment the biasing members 22 are integrally formed with the trigger 9 and form part of the non-integrated portion 7 of the dispensing device 3. Like in the first embodiment, the shroud is integrally formed with the inner container 4, which again is made of PP, while the outer container 5 is made of PET. The inner and outer containers 4, 5 are again made by blow moulding inner and outer layers 24, 25 of a preform 23 (FIGS. 11, 12). Like in the first embodiment, the inner and outer layers 24, 25 are connected at or near the neck 16 of the preform 23 or container 2. They are further connected at or near the bottom 35 of the preform 23, which becomes part of the bottom 17 of the container 2 after blow moulding. A vent opening 19 is again arranged in the bottom 17 of the container 2.

In this embodiment the shroud is made up of two parts, a first part 36 extending along approximately three quarters of the periphery of the dispensing system 1 and a second part 37 partially filling the gap left open by the first part 36. Two slots 38 are formed between the first and second shroud parts 36, 37. These slots 38 serve to accommodate edges 39 of the trigger 9 when the dispensing system 1 is in use and the trigger 9 is depressed. The second shroud part 37 also serves as a stop and as an additional biasing member acting on the trigger 9. The container 2 includes a recess 40 for accommodating a lower part of the trigger 9 when depressed, and also acts as a stop for limiting movement of the trigger.

By integrating a part 6 (the shroud) of the housing and/or frame of the dispensing device 3 into the container 2, the neck 16 can be made smaller than in conventional trigger sprayers. This is due to the fact that the neck 16 only needs to form a seal with an edge 26 of the frame of the dispensing device 3 (FIG. 13A), but does not have to withstand any significant loads acting on the trigger sprayer or fluid dispensing device 1. Consequently, the non-integrated part 7 of the dispensing device 3 can be inserted further into the container 2, as indicated by the distance d. The entire fluid dispensing system 1 can be made more compact than the buffering trigger sprayer of WO 2013/043938 A2, of which two variants are shown in FIG. 14A and FIG. 14B. The buffering trigger sprayer or fluid dispensing system 101 of WO 2013/043938 A2, which is marketed by the applicant under the trademark Impress™, has a dispensing device 103 which extends over a height h1 from a sealing edge 126 with the neck 116 of the container 102 (FIG. 14A). The applicant already developed a more compact version of this buffering trigger sprayer 201, called Impress™ Mini. In this more compact version the height of the dispensing device 3 over the sealing edge 226 has been reduced to a value h2 (FIG. 14B). However, both the Impress and the Impress Mini dispensing systems rely on a connection between the container and the dispensing device that requires certain dimensions in order to ensure sufficient strength and stability. By integrating part of the housing and/or frame with the container, the invention allows the fluid dispensing system 1 to have a height h3 above the sealing edge 26 that is even smaller than that of the prior art Impress Mini buffering trigger sprayer.

Like in the previous embodiment, the non-integrated part 7 of the dispensing device 3 is assembled with the container 2 including the integrated part 6 by snap-fitting. And here again, venting into the space 18 between the inner and outer containers 4, 5 means that there is (substantially) no head of air, so that the fluid dispensing system 1 can be used in any desired orientation.

Figure 16A:
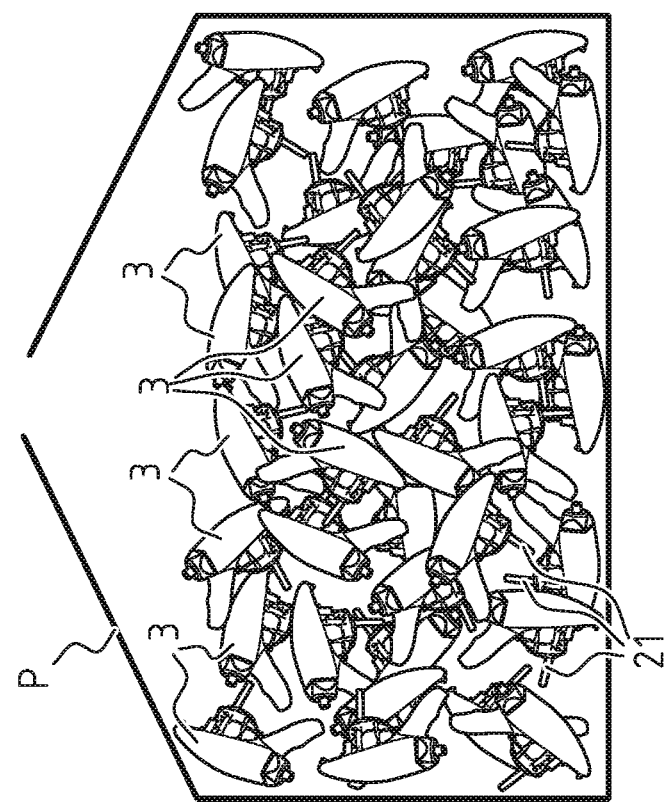
FIGS. 16A and 16B illustrate the compactness of the non-integrated part of the dispensing device of the present invention when compared to a conventional dispensing device.
Figure 16B:
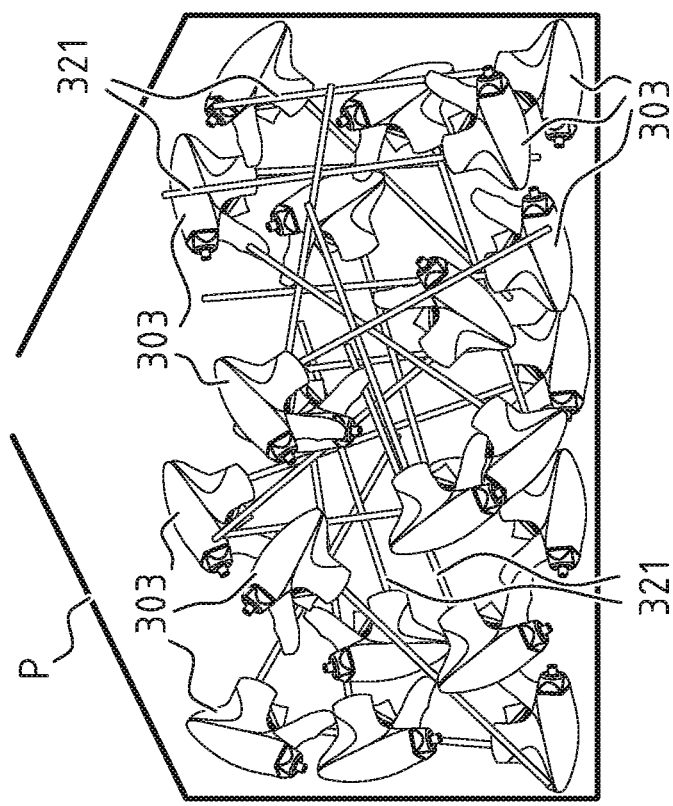

The fluid dispensing system of the present invention and its method of manufacture present many advantages over conventional trigger sprayers and their method of manufacture, as illustrated in FIGS. 15A and 15B and in FIGS. 16A and 16B.

Turning first to FIG. 16, in the prior art misalignment of the (long) dip tube 321 when assembling and filling a fluid dispensing system 1 in a filling line was often a problem. Because the dip tube 321 had to extend all the way to the bottom of the container 302, it was relatively long. And since it also was relatively thin, it was flexible and not easy to direct into the neck 316 of the container 302 (FIG. 15A at the top). As the fluid dispensing system 1 of the invention requires no dip tube or only a very limited length dip tube 21, this problem does not present itself anymore (FIG. 15B at the top).

Another problem that arose when filling prior art containers 302 in a filling line was that due to the pressure at which the fluid was discharged from a filling spout 500, the fluid would start to foam (FIG. 15A at the center). This foaming would lead to leakage and incomplete filling of the container 302. As the container 2 of the present application is a double walled container having a space 18 between the inner container 4, which is to be filled with the fluid, and the outer container 5, foaming can be effectively suppressed. Pressurized air or another gas can be supplied to the space 18 by a pressure source 42, and the pressure in the space 18 will prevent the fluid being injected into the inner container 4 from foaming (FIG. 15B at the center).

Yet another problem of the prior art container 302 was that it was thin walled, which meant it had only limited resistance or stability perpendicular to its wall thickness. Consequently it was hard to apply a label 341, e.g., a label showing the trademark of the contents and providing information, to the sidewall of the container 302 (FIG. 15A at the bottom). The container 2 of the present application, on the other hand, allows a space 18 between the inner and outer layers to be filled with pressurized air, thus providing a stable surface for applying a label 41 (FIG. 15B at the bottom).

And finally, the prior art dispensing devices 303 with their long dip tubes 321 were inefficient when it came to packing these devices in a packaging P of given dimensions (FIG. 16A). Since the dispensing system 1 of the present application allows the dip tube 21 to be much shorter or to be dispensed with altogether, a far greater number of dispensing devices 3 can be packed in a similar packaging, thus reducing costs of storage and transport (FIG. 16B).

Although the invention has been described by way of a number of exemplary embodiments, it will be clear that it is not limited to these embodiments. For instance, other parts of the housing and/or frame could be integrated with the container. Also, parts of the housing and/or frame or moving parts of the dispensing device could be integrated with other layers of the double walled container than described and shown here. Moreover, although in the shown embodiments the double walled container is made by blow moulding a preform that has been made by injection moulding, blow moulding could also be done on the basis of a double walled extrusion. In that case a part of the extrusion could be shaped e.g., by cutting, before blow moulding the double walled extrusion into a container including integrated parts of the housing and/or frame. And finally, the invention is not just applicable to trigger type fluid dispensers, but could be applied equally well to fluid dispensing systems which are operated by other types of actuators, such as pushbuttons or vertically moveable levers. Such dispensing systems having vertically moveable actuators are often used for liquid soaps or lotions.

The scope of the invention is defined solely by the appended claims.

What is claimed is:

1. A method of manufacturing a system for dosed dispensing of a fluid, comprising the steps of:
   manufacturing a container for the fluid, said container comprising a form-retaining outer container and a flexible inner container connected therewith;
   manufacturing a dispensing device comprising a shroud; and
   assembling the container and the dispensing device; wherein the shroud is integrally formed with the inner container, and wherein assembling the container and the dispensing device comprises mounting a non-integrated part of the dispensing device in the shroud which is integrally formed with the inner container,
   wherein:
   the dispensing device comprises moveable parts;
   manufacturing the container comprises integrally forming with the outer container a biasing member which constitutes one of the moveable parts; and
   assembling the container and the dispensing device further comprises engaging the integrally formed biasing member with the non-integrated part of the dispensing device.

2. The method according to claim 1, wherein manufacturing the container comprises mutually connecting the inner and outer container at or near a neck of the container, and forming at least one of the inner or outer containers such that it extends beyond the neck to constitute the integrated part of the shroud.

3. The method according to claim 1, wherein assembling the container and the dispensing device comprises mechanically fastening the non-integrated part of the dispensing device to the shroud part which is integrally formed with the container.

4. The method according to claim 1, wherein manufacturing the container comprises manufacturing the outer container from a material comprising PET and manufacturing the inner container form a material comprising a polyolefin, in particular PE or PP.

5. The method according to claim 1, wherein manufacturing the container comprises injection moulding a preform of the container and then blow moulding the preform into the container.

6. The method according to claim 5, wherein the preform includes an inner layer and an outer layer and wherein injection moulding the preform includes:
   injection moulding one of the inner and outer layers and then injection moulding the other of the inner and outer layers in two subsequent steps in a multi-component injection moulding process; or
   injection moulding the inner and outer layers in separate injection moulding processes and wherein the inner and outer layers are assembled after said injection moulding.

7. The method according to claim 1, wherein manufacturing the container comprises co-extruding a multi-layer tube and then blow moulding the multi-layer tube into the container.

8. A method of manufacturing a system for dosed dispensing of a fluid, comprising the steps of:
   manufacturing a container for the fluid, said container comprising a form-retaining outer container and a flexible inner container connected therewith;
   manufacturing a dispensing device comprising a housing and/or a frame; and
   assembling the container and the dispensing device; wherein at least an integrated part of the dispensing device housing and/or frame is integrally formed with the container, and wherein assembling the container and the dispensing device comprises mounting a non-integrated part of the dispensing device in the part of the dispensing device housing and/or frame which is integrally formed with the container,
   wherein manufacturing the container comprises injection moulding a preform of the container and then blow moulding the preform into the container,
   wherein the preform includes an inner layer and an outer layer and wherein injection moulding the preform includes:
   injection moulding one of the inner and outer layers and then injection moulding the other of the inner and outer layers in two subsequent steps in a multi-component injection moulding process; or
   injection moulding the inner and outer layers in separate injection moulding processes and wherein the inner and outer layers are assembled after said injection moulding.

9. The method according to claim 8, wherein manufacturing the container comprises mutually connecting the inner and outer container at or near a neck of the container, and forming at least one of the inner or outer containers such that it extends beyond the neck to constitute the integrated part of the shroud.

10. The method according to claim 8, wherein assembling the container and the dispensing device comprises mechanically fastening the non-integrated part of the dispensing device to the shroud which is integrally formed with the container.

11. The method according to claim 8, wherein manufacturing the container comprises manufacturing the outer container from a material comprising PET and manufacturing the inner container form a material comprising a polyolefin, in particular PE or PP.

12. The method according to claim 8, wherein:
   the dispensing device comprises moveable parts;
   manufacturing the container comprises integrally forming at least one of the moveable parts; and
   assembling the container and the dispensing device comprises engaging the integrally formed moveable part with the non-integrated part of the dispensing device;

wherein:
manufacturing the container comprises integrally forming the moveable part with one of the inner container and the outer container and integrally forming the housing and/or frame part with the other of the inner and outer container.

13. The method according to claim 12, wherein manufacturing the container comprises integrally forming with the outer container a biasing member which constitutes the moveable part and integrally forming with the inner container the housing and/or frame part.

14. The method according to claim 8, wherein the part of the dispensing device housing and/or frame which is integrally formed with the container is a shroud.

\* \* \* \* \*